(12) United States Patent
Nordin et al.

(10) Patent No.: US 10,035,578 B2
(45) Date of Patent: Jul. 31, 2018

(54) MULTIFUNCTIONAL EROSION PROTECTION STRIP

(71) Applicant: SAAB AB, Linköping (SE)

(72) Inventors: Pontus Nordin, Linköping (SE); Göte Strindberg, Linköping (SE)

(73) Assignee: SAAB AB, Linköping (SE)

( * ) Notice: Subject to any disclaimer, the term of this patent is extended or adjusted under 35 U.S.C. 154(b) by 416 days.

(21) Appl. No.: 14/646,050

(22) PCT Filed: Nov. 20, 2013

(86) PCT No.: PCT/SE2013/051372
§ 371 (c)(1),
(2) Date: May 20, 2015

(87) PCT Pub. No.: WO2014/081380
PCT Pub. Date: May 30, 2014

(65) Prior Publication Data
US 2015/0298791 A1    Oct. 22, 2015

(30) Foreign Application Priority Data
Nov. 20, 2012   (WO) ................ PCT/SE2012/051279

(51) Int. Cl.
*B64C 3/28*        (2006.01)
*F01D 5/28*        (2006.01)
(Continued)

(52) U.S. Cl.
CPC ............... *B64C 3/28* (2013.01); *B64C 23/00* (2013.01); *B64D 15/12* (2013.01); *B64D 45/02* (2013.01);
(Continued)

(58) Field of Classification Search
CPC ....... B64C 2230/12; B64C 23/00; B64C 3/28; B64C 15/12; B64D 15/12
See application file for complete search history.

(56) References Cited

U.S. PATENT DOCUMENTS 3,552,881 A     1/1971   Rogers et al.
5,403,653 A  *  4/1995   Moreton ................. B32B 15/14
                                            428/300.4
(Continued)

FOREIGN PATENT DOCUMENTS

EP       2256034 A1   12/2010
GB        833675 A     4/1960
(Continued)

OTHER PUBLICATIONS

PCT/ISA/210—International Search Report—dated Mar. 21, 2014 (Issued in Application No. PCT/SE2013/051372).
(Continued)

*Primary Examiner* — Philip J Bonzell
*Assistant Examiner* — Michael B Kreiner
(74) *Attorney, Agent, or Firm* — Venable LLP; Jeffri A. Kaminski

(57) ABSTRACT

An airfoil article including a composite skin having a first surface and a second surface opposite first surface, forming a leading edge. The leading edge is during use subjected to an airflow meeting the leading edge at stagnation points. The leading edge includes an elongated member. The outer surface of the elongated member is arranged flush with the first surface of the composite skin such that an essentially smooth aerodynamic surface of the leading edge is formed. The elongated member is adapted to serve as an erosion protection of the leading edge and to function as an electrode of a plasma generating system.

21 Claims, 6 Drawing Sheets

(51) Int. Cl.
- *B64D 15/12* (2006.01)
- *B64D 45/02* (2006.01)
- *B64C 23/00* (2006.01)
- B64D 45/00 (2006.01)

(52) U.S. Cl.
CPC .......... *F01D 5/282* (2013.01); *B64C 2230/12* (2013.01); *B64D 2045/009* (2013.01); *F05D 2240/303* (2013.01); *Y02T 50/166* (2013.01); *Y02T 50/672* (2013.01); *Y02T 50/673* (2013.01)

(56) References Cited

U.S. PATENT DOCUMENTS

| | | | |
|---|---|---|---|
| 5,782,607 | A | 7/1998 | Smith et al. |
| 6,447,254 | B1 | 9/2002 | Holowczak et al. |
| 7,744,039 | B2 * | 6/2010 | Miles .................... B64C 23/005 |
| | | | 244/205 |
| 2007/0075188 | A1 | 4/2007 | Stoner et al. |
| 2008/0023589 | A1 | 1/2008 | Miles et al. |
| 2009/0212164 | A1 * | 8/2009 | Osborne ............... B64C 23/005 |
| | | | 244/205 |
| 2010/0004799 | A1 | 1/2010 | Drouin, Jr. et al. |
| 2010/0308170 | A1 | 12/2010 | Hadley et al. |
| 2013/0292511 | A1 * | 11/2013 | Osborne ............... B64C 23/005 |
| | | | 244/75.1 |

FOREIGN PATENT DOCUMENTS

| | | |
|---|---|---|
| GB | 2461133 A | 12/2009 |
| WO | WO-8100993 A1 | 4/1981 |
| WO | WO-2010119298 A1 | 10/2010 |

OTHER PUBLICATIONS

PCT/ISA/237—Written Opinon of the International Searching Authority—dated March 21, 2014 Issued in Application No. PCT/SE2013/051372).

PCT/IPEA/409—International Preliminary Report on Patentability—dated March 17, 2015 Issued in Application No. PCT/SE2013/051372).

* cited by examiner

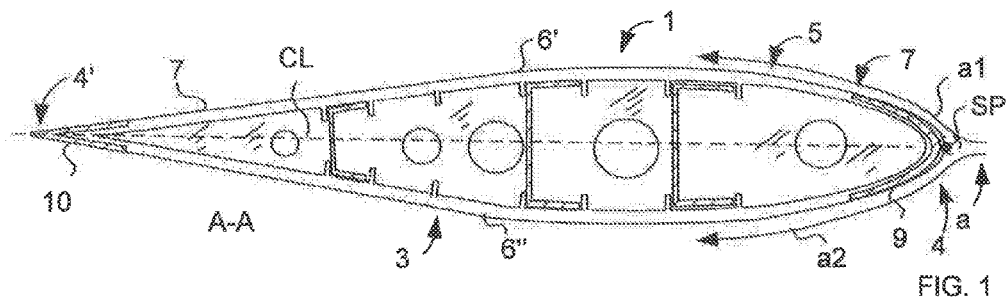
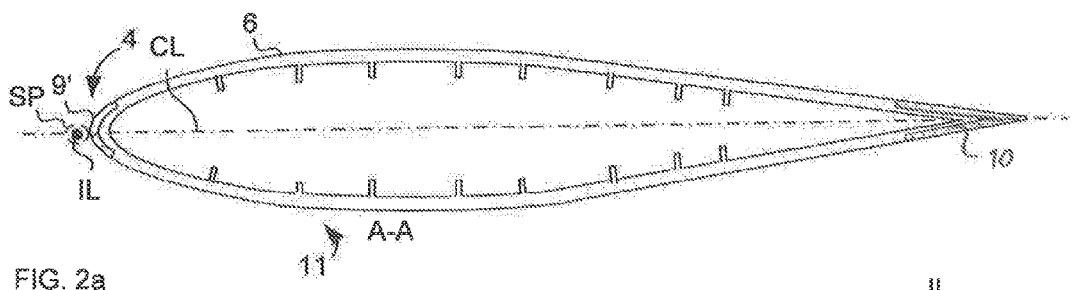
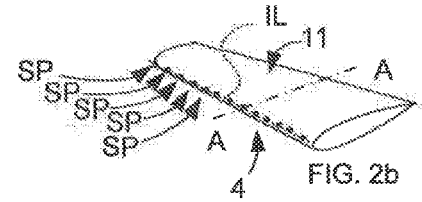
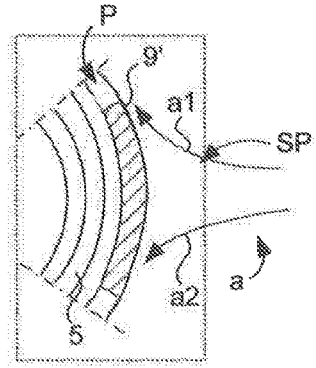
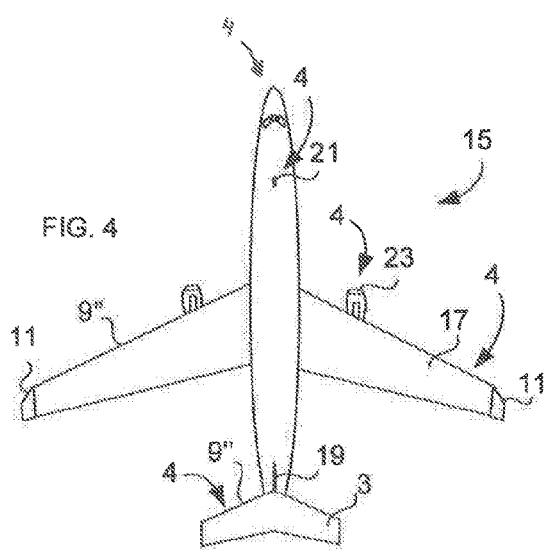
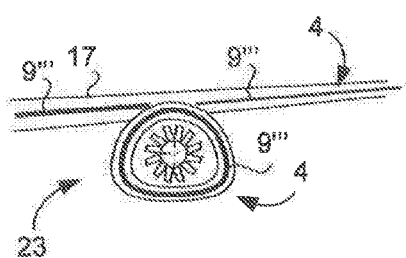

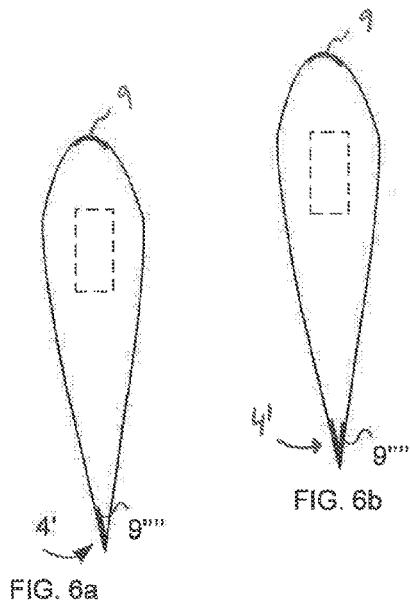
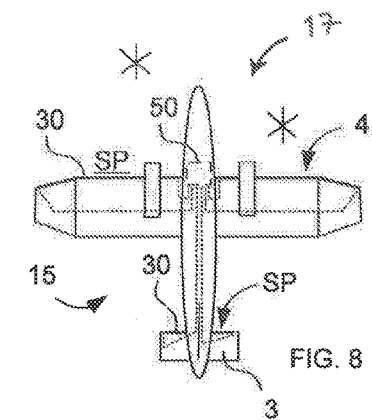
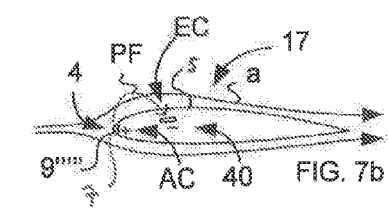
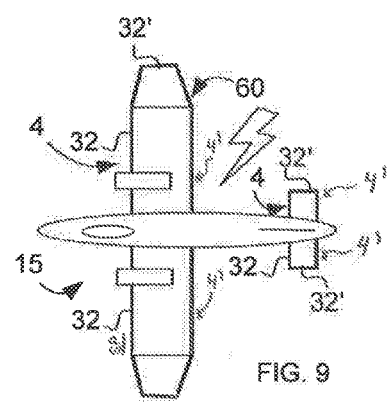
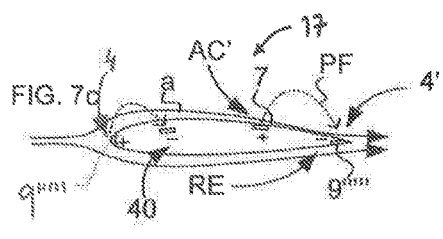
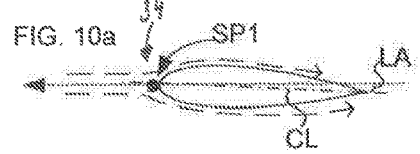
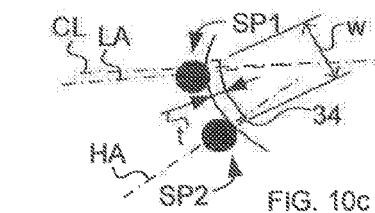
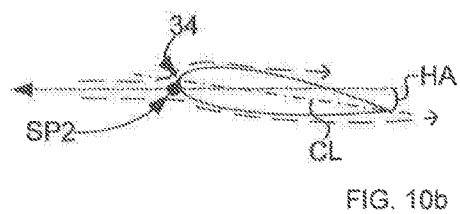
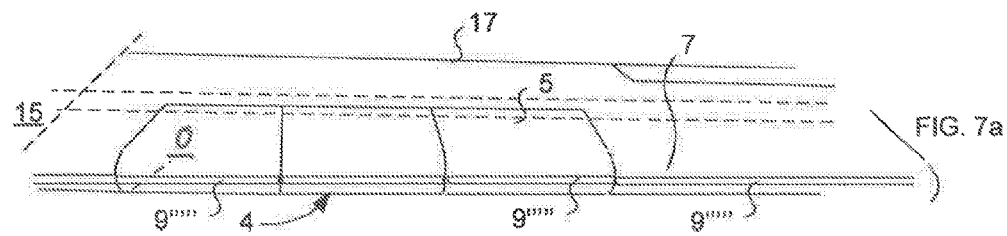

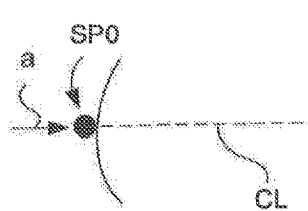
FIG. 17a
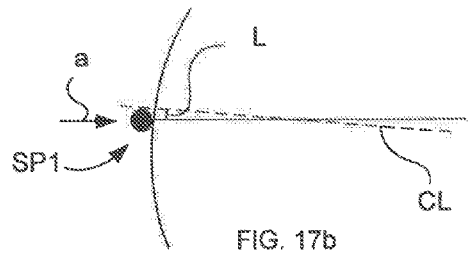
FIG. 17b
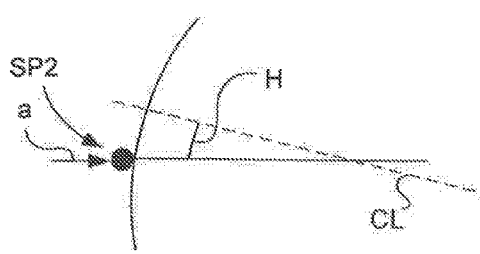
FIG. 17c
FIG. 17d
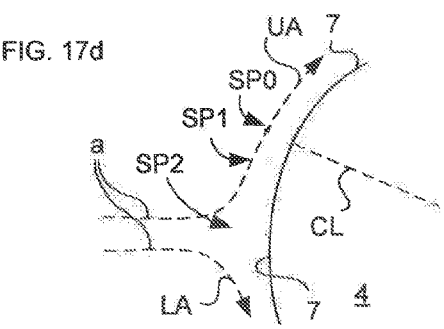
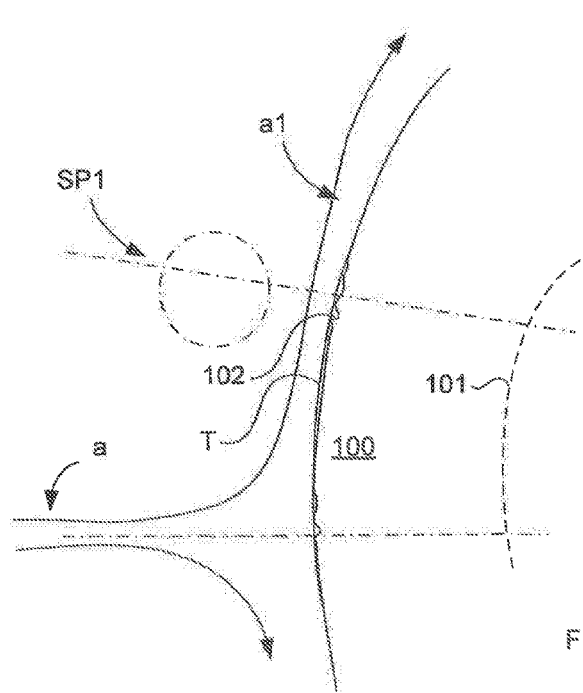
FIG. 18
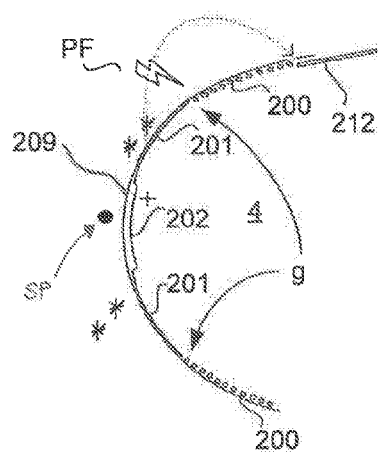
FIG. 19

MULTIFUNCTIONAL EROSION PROTECTION STRIP

CROSS-REFERENCE TO RELATED APPLICATIONS

The application is the national phase under 35 U.S.C. § 371 of PCT/SE2013/051280 filed 20 Nov. 2013.

TECHNICAL FIELD

The present invention relates to an airfoil article.

The present invention also relates to an aircraft comprising at least one airfoil article and a plasma generating system.

Furthermore, the present invention relates to a system for an airfoil article.

The invention relates to the aircraft industry. The invention is not limited thereto, but could also be related to activities of airline companies as well. The invention can be used also in automotive engineering, trains, wind power blades etc.

BACKGROUND ART

Current aerodynamic technologies for aircraft wings, vertical and horizontal stabilizers etc. include leading edges manufactured of composite material. However, such leading edges generally lack sufficient and effective erosion protection functionality that supports laminar airflow. They comprise steps, gaps, uneven surfaces, fastener protrusions etc. The eroded leading edges must be replaced/repaired or covered by tapes (or other protections) for providing a smoother aerodynamic surface. In some cases metal plates are bonded/attached to the leading edges.

The airfoil skins of modern aircraft of today are made of composite materials (such as glass fiber or carbon fiber reinforced epoxy), wherein the aerodynamic surface (of the prior art airfoil stagnation point) is relatively soft and rain erosion may damage the surface accordingly so that unwanted turbulence of the airflow occurs (which negatively influence the amount of natural laminar flow NLF), which in turn will increase fuel consumption.

Lack of laminar airflow over the leading edge limits the aerodynamic efficiency and will increase the fuel burn and result in high greenhouse gas emission of the vehicle.

GB 2 461 133 discloses aircraft erosion-protection devices for protecting the exterior of the aircraft from erosion. The devices comprise adhesive polyurethane tape cut by means of a computer.

GB 833 675 discloses anti-icing surface heating metallic layers applied by spraying or painting direct onto the skin of an aircraft wing. An insulating layer of plastic is applied onto the metallic layer.

U.S. Pat. No. 3,552,881 discloses a metal sheet moulded into a bottom skin for providing erosion protection near a tip of a rotor blade.

US 2007/075188 A1 discloses an airfoil article wherein the leading edge is wrapped with a metal foil heater. The metal foil heater should be resistant to rain drop erosion and particulate abrasion. The foil heater may comprise a rectangular sheet of Titanium.

An objective is to provide an airfoil article designed to meet the requirements necessary to enable and maintain laminar flow over the airframe leading edge.

Another objective is to provide an airframe leading edge that over long time will keep as smooth aerodynamic surface as possible.

Another objective is to provide a system of an aircraft enabling multifunctional properties.

A further objective is to cost-efficiently manufacture an airfoil article of an aircraft, which article can be used for different types of aircraft systems. Today aircraft systems connectable to single functions, such as plasma generator systems, anti-/de-icing systems, lightning conductor systems, are generally bulky and heavy and involve a large number of components.

Another objective of the present invention is to develop and improve known technique.

SUMMARY OF THE INVENTION

This has been achieved by the airfoil article defined in the introduction as well as by the system.

The airfoil article according to the present invention comprises a composite skin. The composite skin has a first surface and a second surface opposite to said first surface. The first surface of the composite skin is the outer surface and is at least partially exposed to the atmosphere and thus the airflow during use, for example during flight. The composite skin forms a leading edge and is adapted to during use be subjected to an airflow meeting the leading edge at stagnation points. The airflow is divided into a first and second airflow at the stagnation points. and at which stagnation points the local velocity of the airflow is essentially zero. Furthermore, the leading edge comprises an elongated member comprising an electrically conductive material. Preferably, the elongated member essentially consists of said electrically conductive material. The elongated member has an inner surface and an outer surface opposite to said inner surface. The inner surface of the elongated member is facing the first surface of the composite skin and the outer surface of the elongated member is opposite to first surface of the composite skin. The outer surface of the elongated member is exposed to the atmosphere. Moreover, the outer surface of the elongated member is arranged flush with the first surface of the composite skin such that an essentially smooth aerodynamic surface of the leading edge is formed.

In the context of the present invention "flush" refers to an arrangement and/or mounting of the outer surface of the elongated member, such that it is very precisely positioned in level with the outer surface of the adjacent composite skin (with or without coatings, as applicable) subjected to airflow during use, such as during flight. The outer surface of the elongated member is flush with the adjacent composite skin on both sides in the chord wise direction. The purpose of this precise positioning is that any resulting gaps or steps will be small enough to maintain laminar air flow over the smooth elongated member and the joint to the adjacent smooth composite wing skin area. The surface requirements necessary to maintain laminar flow are known to a person skilled in the art.

The elongated member has an extension in a length direction being essentially parallel with an imaginary line intersecting with the stagnation points and a width extending in a chord wise direction at least covering the stagnation points of low angle of attack and the stagnation points of high angle of attack and the area there between. Thereby, it may effectively serve as an erosion protection of the leading edge.

Furthermore, the elongated member is adapted to function as an electrode of a plasma generating system.

Preferably, the elongated member of the airfoil article according to the present invention may further be adapted to serve as a heating element of a de-/anti-icing system.

Furthermore, the elongated member may be adapted to serve as a conductor of a lightning conductor system.

The elongated member of the airfoil article according to the present invention may preferably be adapted to operate using alternating current (AC) and/or an alternating current (AC) superposed on a direct current (DC).

Preferably, the length of the elongated member corresponds with the longitudinal length of the leading edge.

Each property of the elongated member of the leading edge described hereinbefore contributes to promote the laminar flow.

The elongated member may suitably be made of a metal matrix composite (MMC), or ceramic material or metallic material or any combinations thereof. One example of a suitable MMC is MMC comprising Alumina and Silicon carbide.

The metallic material could be Copper, Titanium or its alloys, stainless steel etc. The electrical conductivity of Copper is high but the ability to withstand erosion can, under some conditions, be less than Titanium and stainless steel. Also, the density of Copper is high. Therefore, it is preferred to use a metallic material other than Copper. Furthermore, the metallic material of the elongated member may suitably be of made of Aluminum alloy materials or Nickel alloy materials.

According to an example of the present invention, the width of the elongated member extending in a chord wise direction is such that it at least covers the stagnation points of low angle of attack and the stagnation points of high angle of attack and the area there between and tapers in the direction from one distal end to another end along the leading edge.

The elongated member preferably exhibits a width in the chord wise direction covering the stagnation points and sufficient areas to be optimized to lightning and/or de-/anti-icing and/or plasma actuator requirements of the leading edge. The elongated member is comprised in a multifunctional system The multifunctional member is arranged at the leading edge of the airfoil article.

In a further example of the present invention a trailing edge of the airfoil article comprises a second elongated member having an outer surface flush with the outer surface of the composite skin such that a smooth aerodynamic surface is achieved, the second elongated member is provided to follow an imaginary line intersecting with the trailing edge.

The width and thickness of the first and/or second elongated member, in combination with material selection of the elongated member, are preferably so determined that the elongated member will be flexible in at least a length direction and/or width direction of the elongated member, such that it can conform with the natural wing bending that may occur during flight. In an example of the present invention the first and/or second elongated member(s) of the airfoil article may suitably be divided in lengthwise sections.

In a further example of the present invention a barrier coating may suitably be provided between the first and/or second elongated member and the composite skin. Preferably, the elongated member of the airfoil article is fit into a recessed area of the composite skin, wherein the depth of the recessed area is essentially equal to the thickness of the elongated member after curing of the composite.

Suitably, the elongated member/-s (such as a metal strip/-s) is/are adhered to the composite skin by means of an aircraft approved adhesive, resin or other suitable material and is positioned in a recessed area of the skin in such way that a smooth transition area, defined between an upper aerodynamic surface of the member and an aerodynamic surface of the composite (fiber reinforced plastic) skin, is provided. Alternatively, they may also arranged in a recessed area of the composite skin by other previously known deposition methods, such as by spraying, physical vapor deposition or the like, as long as a solid elongated member flush with the aerodynamic surface of the composite skin of the airfoil article can be achieved.

The elongated member of the leading edge of the airfoil article according to the present invention may suitably comprise in the chord wise direction a middle section and two outer sections, wherein the elongated member has a greater thickness in the middle section than the thickness of each of the two outer sections.

According to one example of the invention, the elongated member may suitably be formed of a thicker middle section and outermost thinner sections and adjacent the end of the thinner sections remote of the thicker middle section an extension may be provided in the form of outer lightning protection foils or the like, which extend wider over the airfoil than the other sections. The middle section serve as the main erosion protection at the same time as some areas of the outermost thinner sections may serve as emitters for producing a plasma field promoting laminar airflow. The thinner sections may also serve as de-/anti-icing device which also promotes laminar airflow. Current applied to the strip member for de-icing will due to higher resistance (achieved by the thin strip sections) generate heat. This also saves weight. The lighting protection foil (can be a Copper net) serve as a lightning protection, saving the aerodynamic surface, thus promoting laminar airflow.

Each property of the elongated member of the leading edge thus contributes to promote the laminar flow, thereby less turbulence which saves fuel.

Preferably, the multifunctional strip (i.e. elongated member of leading edge) comprises three functionalities; erosion protective property, de-/anti-icing property, and plasma field generating emitter. Suitably, such strip is combined with a laterally positioned lightning protection member. Alternatively, the strip could itself function as a lightening protection member.

Preferably, the application of the elongated member/-s is/are made by adhesion of the member to the composite skin in an integral curing process, in which the airfoil article cures in one curing step. Such process may include lay up of composite plies or resin infusion mould curing. In such way is achieved that a smooth aerodynamic surface,—by the composite skin and the erosion protection and high strength adhered member comprising multifunctional properties—, of the airfoil article is provided.

At the same time, a long-life performance of the airfoil article is achieved providing a laminar airflow and lower fuel consumption. The leading edge of composite is of low weight due to the location of the member limited to a position covering the stagnation points and sufficient areas for/or optimized to lightning protection and/or de-/anti-icing and/or plasma actuator requirements of the leading edge. The leading edge, and thus the airfoil article, will in such way be of low weight and at the same time resistant against erosion.

Due to the flush arrangement of the outer surface of the elongated member, suitably a metal strip, to the first surface of the composite skin, the aerodynamic surface is smooth and low fuel consumption is achieved. Since the fastening is preferably achieved by application of adhesive between the composite and the member, no rivet heads or screw heads are disturbing the airflow. The same effect may also be achieved by applying the member by deposition techniques such as spraying or PVD.

Preferably, the member is a fine powder solid/or solid metallic material which is integrated in the leading edge composite.

The width of the elongated member is dimensioned to at least cover the stagnation points of low angle of attack and the stagnation points of high angle of attack and the area there between.

In such way is achieved that the member (such as a metal strip) exhibits the lowest weight possible, but still the airfoil article will maintain its smooth aerodynamic surface during use. Also, sufficient erosion protection may be achieved.

By using material of the member which is hard and of low weight (for example Titanium or its alloys or MMC even lower weight of the airfoil article is achieved. Lower weight promotes the saving of fuel.

Suitably, the member covers not only the stagnation points (low angle and high angle of attack), but also zero angle of attack (in some cases during acceleration on runway before pitching or level flight of e.g. a stabilizer or fin).

Alternatively, the member covers an area of the leading edge that is larger than the area defined by said stagnations points, i.e. exhibiting a slightly larger width. By providing such a wider member having larger width, the leading edge of the airfoil article may be optimized further for use for multifunctional purpose at the same time as it protects the leading edge from rain, dirt, hail etc.

The width is defined in chord wise direction as the extension of the member transverse its essential longitudinal extension extending along the leading edge. The width preferably narrows along the span wise direction towards the wing tip.

Preferably, the length of the elongated member corresponds with at least the length of the leading edge in span wise direction.

In such way the member will provide a full erosion protection to the airfoil article. A full length member covering the length of said entire imaginary line intersecting with the stagnation points is also cost-effective to mount to the leading edge as no airflow disturbing joints have to be finished for providing a smooth aerodynamic surface.

Suitably, the width of the elongated member tapers in the direction from one distal end to another.

Thereby weight is saved. For example, the member, such a metal strip of a wing, tapers in a direction towards the wing tip section, as the wing chord of the wing gets smaller. The flexibility of the wing does not disturb the application of such tapering metal strip. A metal strip exhibiting smaller width performs greater flexibility than a strip with larger width. Thus, as the wing during the flight to a greater extend bends (upward and downward during flight) within the area of the wing tip section, the narrower (in case of stepwise narrowing of the metal strip) or tapering metal strip provides flexibility in a sufficient manner.

Preferably, a trailing edge of the airfoil article also comprises a flush elongated member.

Thereby is achieved that also the trailing edge of a composite article may be protected from lightning.

The material of the elongated member provided on the trailing edge of the airfoil article may suitably be a metal matrix composite (MMC), or the elongated member is ceramic or metallic or any combinations thereof. Suitably, the metal material is stainless steel, a Titanium alloy or MMC (e.g. Aluminum plus Silicon carbide particles).

Preferably, the width and thickness of the elongated member, in combination with material selection of the elongated member, are so determined that the elongated member will be flexible to such degree that it at least corresponds with a curvature of the leading edge.

Thereby is achieved a strip that can be made very long without any interruptions, which provides for a smooth aerodynamic surface of the leading edge. The curvature of the leading edge is in some cases with relatively small radius (such as a winglet transition region leading edge seen from a direction corresponding with the flight direction). By applying the member having a relatively small width just covering the critical stagnation points, the member (such as a metal strip) is possible to bend following the curvature of the leading edge.

In the manufacturing of the elongated member, the elongated member may be pre-formed to a shape or formed in the same cure assembly as the composite part.

Suitably, the elongated member is divided in lengthwise sections.

In such way it is possible to easily produce and repair (for example in case of bird impact) the member of the airfoil article by just replacing a damaged section of the member.

Preferably, a barrier coating is provided between the elongated member and the composite skin.

In such way is the inner side of the member protected from corrosion due to moisture transportation through the composite skin.

Suitably, the elongated member is fit into a recessed area of the skin, the depth of the recessed area is equal to/or larger than the thickness of the elongated member.

Thereby is achieved that a smooth aerodynamic surface of the leading edge of the airfoil article can be produced in a cost-effective way.

The elongated member is according to the present invention is adapted to function as an electrode, preferably an actuator, in a plasma generator system for improving the aerodynamic efficiency.

Thereby is provided that an airfoil article, exhibiting a part of a plasma generator system, will be cost-effective produced.

Preferably, the elongated member also serves as a heating element of a de-/anti-icing system.

In such way is achieved that an airfoil article, exhibiting a part of a de-/anti icing system, will be cost-effective produced.

Suitably, the elongated member is also adapted to serve as a conductor of a lightning conductor system.

Thereby is provided that an airfoil article, exhibiting a part of a lightning conductor system, will be cost-effective produced.

Preferably, the features of adapting the elongated member to serve as a heating element of an anti-/de-icing system and adapting the same elongated member to serve as a conductor of a lightning conductor system is combined.

Suitably, the airfoil article comprises all parts of said plasma generator system, said anti-/de-icing system, said lightning conductor system.

The elongated member flush with the aerodynamic surface of the leading edge of the airfoil article preferably constitutes an erosion protection at the same time as an electrode of a plasma generating system and/or a heating element of an anti-/de-icing system. The elongated member flush with the aerodynamic surface of the leading edge may also constitute an electrode of a lightning conductor system to provide a lightning protection. Preferably, the elongated member provides all four functions, i.e. erosion protection, generation of plasma, anti-/de-icing and lightning protection.

In order to provide the intended functions, the elongated member is preferably adapted to be subjected to and operate under both a direct current (DC) and an alternating current (AC) at the same time during use of the airfoil article, such as during flight. In such a case, the direct current provided to the member enables the member to function as a resistive heating element thereby providing the function of anti-/de-icing of the airfoil article. The alternating current (AC) is provided to enable the generation of a plasma over the airfoil article to promote laminar airflow. More specifically, the elongated member serves as at least one electrode in an actuator and cooperates with a receiver arranged at a distance from said elongated member to generate a plasma there between. The alternating current is provided with a high frequency to enable the generation of a plasma. The technology of plasma generation is as such previously known and is therefore not further described in the present disclosure. Any previously known plasma generating system may be used as long as the elongated member of the present invention serves the function of an electrode. Examples of plasma generating systems can for example be found in US 2009/0173837 A1 and WO 2012/036602.

Thereby is achieved that an airfoil article that can be produced in a cost-effective manner, which article serve as a platform for different functions of the aircraft.

Preferably, the airfoil article forms a leading edge part, designed to be replaceable fixed to an adjacent leading edge part, the article comprises a first and a second transverse scarf joint (or but joint) edge adapted to fit adjacent leading edge parts.

In such way is achieved that an airfoil article cost-effective can be replaced at the same time as the airfoil article is of low weight, is erosion protected, and serve as a platform for several functions, such as plasma generator system, said anti-/de-icing system, said lightning conductor system, etc.

Thereby is achieved that an airfoil article cost-effective can be produced, at the same time as features such as erosion protection, multifunctional properties, low weight property, and furthermore the aimed task "promoting laminar air flow over a long time period decreasing service costs", has been satisfied.

The thickness of the elongated member is suitably tailored to the intended functions thereof and depends on the material used. In most cases, the minimum thickness is determined by the intended erosion protection whereas the maximum thickness in most cases is determined by the desire to minimize weight of the airfoil article and to ensure that the elongated member could effectively serve as an electrode of a plasma generation system. A practical thickness of the elongated member may for example be 0.05 mm to 2 mm, preferably about 0.1-1 mm. The mechanical stiffness of the elongated member in the area corresponding to the approximate location of the stagnation points (SP) can be tailored by the addition of an electrically isolated or non-conductive material to the inner surface of the elongated member.

The present invention also relates to an aircraft comprising at least one airfoil article such as described hereinbefore and a plasma generating system.

Furthermore, the present invention relates to a system for an airfoil article. The airfoil article includes a composite skin. The composite skin has a first surface and a second surface opposite to said first surface. The first surface of the composite skin is the outer surface and is at least partially exposed to the atmosphere. The composite skin forms a leading edge and is adapted to during use be subjected to an airflow meeting the leading edge at stagnation points. The airflow is divided into a first and second airflow. and at which stagnation points the local velocity of the airflow is essentially zero. Furthermore, the leading edge comprises an elongated member comprising an electrically conductive material. Preferably, the elongated member essentially consists of said electrically conductive material. The elongated member has an inner surface and an outer surface opposite to said inner surface. The inner surface of the elongated member is facing the first surface of the composite skin and the outer surface of the elongated member is facing away from the first surface of the composite skin and is at least partially exposed to the atmosphere. Moreover, the outer surface of the elongated member is arranged flush with the first surface of the composite skin such that an essentially smooth aerodynamic surface of the leading edge is formed.

The system according to the present invention may include any of the hereinbefore and hereinafter described examples of airfoil articles and elongated members.

The elongated member has an extension in a length direction being essentially parallel with an imaginary line intersecting with the stagnation points and a width extending in a chord wise direction at least covering the stagnation points of low angle of attack and the stagnation points of high angle of attack and the area there between. The elongated member is adapted to serve as an erosion protection of the leading edge and the system also comprises a plasma generating system comprising a first electrode and a second electrode for generation of a plasma, wherein the elongated member constitutes the first electrode and/or the second electrode. The system further comprises at least one control unit coupled electrically to the elongated member, for controlling the electrical energy supply to the elongated member The system according to the present invention may suitably further comprise an anti-/de-icing system comprising a resistive heating element for heating of at least a part of a leading edge of the airfoil, wherein the elongated member constitutes said heating element.

Furthermore, the system may preferably comprising a lightning conductor system adapted to protect the airfoil in the event of a lightning strike, the lightning conductor system comprising a first conductor, and wherein said first conductor constitutes the elongated member.

Suitably, the elongated member of the leading edge in the system according to the present invention is adapted to operate using direct current (DC) and/or alternating current (AC). In one example of the system the elongated member of the leading edge is adapted to operate using alternating current (AC) superposed on direct current (DC).

BRIEF DESCRIPTION OF THE DRAWINGS

The present invention will now be described by way of examples with references to the accompanying schematic drawings, of which:

FIG. 1 illustrates a cross-section A-A of a wing airfoil article comprising a flush elongated member in the form of a sheet metal;

FIGS. 2a-2b illustrates a cross section of a winglet having a flush elongated member in the form of a steel strip;

FIGS. 3a-3b show the principle of stagnation points SP;

FIG. 4 illustrates an aircraft comprising a plurality of leading edges;

FIG. 5 shows an engine fairing and wing seen in a front view;

FIGS. 6a-6b illustrates antenna fairings protected from rain erosion during flight;

FIGS. 7a-7c illustrate a wing comprising a flush elongated member in the form of a electrode strip of the leading edge for an additional functionality and a second elongated member in the form of a electrode flush or below the aerodynamic surface;

FIG. 8 illustrates an aircraft comprising a elongated member in the form of a metal strip at edges of the aircraft for a de-icing/anti-icing system;

FIG. 9 shows an aircraft comprising leading and trailing edges with flush elongated members in the form of metallic strips in a lightning protection system;

FIGS. 10a-10c shows the determination of the width of an elongated member;

FIGS. 17a-17d illustrates the principle of stagnation points;

FIG. 18 shows a portion of a leading edge of a prior art wing;

FIG. 19 shows a multifunctional elongated member;

DETAILED DESCRIPTION

Figure 11:
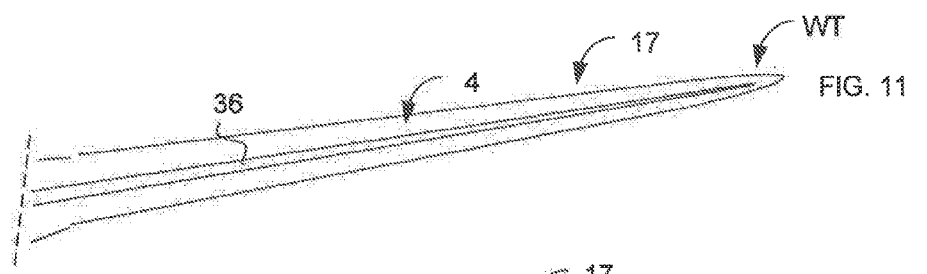
FIG. 11 illustrates a wing in a view from front and an elongated member in the form of a strip.

Hereinafter, embodiments of the present invention will be described in detail with reference to the accompanying drawings, wherein for the sake of clarity and understanding of the invention some details of no importance are deleted from the drawings. Moreover, the drawings shall not be considered drawn to scale as some features may be exaggerated in order to more clearly illustrate the invention. Although, not illustrated in the figures of the present invention is also valid for a swept wing.

The term "flush arrangement" or "flush mounting" refers to an arrangement and/or mounting of the outer surface of the elongated member, such that it is very precisely positioned in level with the outer surface of the adjacent composite skin (with or without coatings, as applicable) subjected to airflow during use, such as during flight. The outer surface of the elongated member is flush with the adjacent composite skin on both sides in the chord wise direction. This definition of "flush" applies to all examples of the present invention wherein the term is used. The purpose of this precise positioning is that any resulting gaps or steps will be small enough to maintain laminar air flow over the smooth strip and the joint to the adjacent smooth composite wing skin area. The surface requirements necessary to maintain laminar flow are known to a person skilled in the art.

FIG. 1 schematically illustrates a cross-section A-A of an airfoil article 1 in the form of a wing 3. As the wing 3 is aligned with the incoming airflow a there will be an angle, called angle of attack, which in this case is zero relative a centre line (chord line) CL. The airflow a is thus divided into a first a1 and second a2 airflow at a leading edge 4 of the article 1. When the wing 3 moves through the air, the leading edge 4 is subjected the airflow a meeting the leading edge 4 at imaginary stagnation points SP in front of the leading edge. The point where the airflow a impacts the leading edge 4 is called the stagnation point SP and the airflow exhibits essentially zero velocity in this point. Of course, there will be an indefinite number of stagnation points SP along the leading edge 4 following an imaginary line IL intersecting with the line of stagnation points SP (see FIG. 2b). In case of an unprotected carbon reinforced polymer (CFRP) surface, the airstream could create a rain erosion damage to the CRFP material in the vicinity of the stagnation points. The airflow a will have a local velocity that is essentially zero at the stagnation point SP. The wing 3 thus comprises the present leading edge 4 and the trailing edge 4', each of which comprises a flush elongated sheet metal 9, 10 parallel with the imaginary line IL intersecting with leading edge 4 stagnation points SP respectively. The composite skin 5 exhibits an upper skin 6' and lower 6" skin. A portion of the composite skin 5 forms the leading edge 4. The respective imaginary intersecting line IL extends essentially parallel with the elongation of the leading edge 4. The first sheet metal 9 covers an area of the leading edge 4 for achieving an erosion protection of the airfoil article 1. A second sheet metal 10 covers the trailing edge 4' of the wing 3. The first sheet metal 9 covering an area of the leading edge 4 of the wing 3 may primarily be used for a multifunctional purpose. The second sheet metal 10 covering the trailing edge 4' of the wing 3 may optionally be used for multifunctional purpose. Thereby is achieved that the leading edge 4/trailing edge 4' of the airfoil article 1 is during use protected from erosion, where the normal use of the airfoil article 1 involves an angle of attack which is near zero. In this embodiment the sheet metal 9 covers an area that is larger than the area exactly covering the stagnations points SP. The sheet metal 9 exhibits a wider width than the area defined by the stagnation points SP seen in the transverse cross-section A-A. By providing such a wider sheet metal having larger width, the leading edge 4 of the airfoil article 1 may be use for multifunctional purpose at the same time as it protects the leading edge 4 from erosion. The width is defined as the extension of the sheet metal 9 transverse its essential longitudinal extension extending along the leading edge 4.

Although, the elongated member is in the context of FIG. 1 and the subsequent figures described as being a metal strip other materials of the elongated member may be applied to all of these examples. The elongated member may for example be a metal matrix composite (MMC), or the elongated member may be ceramic. It is also possible that the elongated member is made of a synthetic resin mixed with metallic particles.

In the case of the elongated member being metallic, the metal material thereof can be Copper, Titanium or its alloys, stainless steel, Aluminum alloy or Nickel alloy. One example of a suitable MMC is an Aluminum Silicon carbide MMC.

The material of the elongated member is not limited to the examples of materials listed hereinbefore FIG. 2a schematically illustrates a cross section of a winglet 11. The leading edge 4 of the winglet 11 comprises a composite skin 6. The composite skin 6 is also here subjected to an airflow meeting the leading edge 4 at an imaginary line IL comprising an indefinite number of stagnation points SP, which imaginary line IL extends parallel with the elongation of the leading edge 4 (see FIG. 2b). The airflow is divided into a first and second airflow at each stagnation point SP. Each stagnation point SP is defined as an air volume in front of the leading edge 4 where the local velocity of the airflow is essentially zero. The leading edge 4 comprises a flush elongated metal strip 9' of stainless steel or Titanium alloy or MMC having such extension that it is parallel with said imaginary line IL. Furthermore, the trailing edge in FIG. 2a is provided with an elongated member 10, which may optionally be used for multifunctional purpose. In FIGS. 2a and 2b a broken line defines the centre line CL of the chord of the airfoil article.

In FIGS. 3a-3b are schematically shown the principle the stagnation point SP. The airstream a meets the leading edge 4 and divides into an upper a1 and lower a2 airflow. The airflow a is divided at the stagnation point SP. At the stagnation point SP the local velocity of the airflow is essentially zero. The metal strip 9' protects the composite of the leading edge 4 composite skin 5 from erosion. If the angle of attack of the airfoil shown in FIG. 3a will be increased, a new stagnation point will occur, and an upper airflow will flow over the area previously adjacent to the other stagnation point SP. Outer ply P of a laminate of composite and reinforcing fibers, constituting the composite skin 5, is partially leaved out a portion for forming a recess corresponding with the area adjacent the stagnation points SP, in which recess the metal strip 9' is adhered.

FIG. 4 schematically illustrates an aircraft 15 comprising a plurality of leading edges 4. The aircraft 15 comprises leading edges 4 of a winglet 11, a wing 17, a wing 3, a fin 19, a nose cone, an engine fairing 23. Each leading edge 4 faces the airstream when the aircraft 15 moves through the air. Each leading edge 4 of the aircraft 15 comprises a flush elongated member 9" having such extension that it follows an imaginary line intersecting with the stagnation points (the positions of which is determined from normal use of the aircraft).

FIG. 5 schematically illustrates an engine fairing 23 and wing 17 seen in a front view. Nickel alloy strips 9'" are mounted at the leading edges 4 of the engine fairing 23 and the wing 17. The Nickel alloy strip 9'" exhibiting a stepwise narrowing wherein it has a smaller width outboard the engine fairing 23, since the wing being thicker in this place than inboard the engine fairing 23. The stagnation points exhibit a wider width due to thicker wing chord.

FIGS. 6a-6b schematically illustrate two further embodiments. FIG. 6a shows an antenna fairing 21 made of plastic composite exhibiting a trailing edge 4' comprising a flush Aluminum sheet 9"" being inset at one single side, but still providing an erosion protection to the trailing edge 4'. FIG. 6b shows the same type of antenna fairing 21 as in FIG. 6a but exhibiting V-formed Aluminum sheet 9"" thus arranged within the area of the stagnation point of the trailing edge 4'. In both cases, a flush elongated member 9 is provided at the leading edge.

FIGS. 7a-7c schematically illustrate a wing 17 of an aircraft 15 according to further embodiments. FIG. 7a shows the wing 17 in a perspective view from the front. Metal strips 9""' are mounted flush with the aerodynamic surface of the wing 17 i.e. the elongated member is very precisely positioned in level with the outer surface of the adjacent composite wing structure on both sides of the strip. The purpose of this precise positioning is that any resulting gaps or steps will be small enough to maintain laminar air flow over the smooth strip and the joint to the adjacent smooth composite wing skin area. The surface requirements necessary to maintain laminar flow are known to the person skilled in the art. Thus, the outer surface 7 of each strip 9""' exhibits the same level (within an area defined as a transition region between the strip 9""' and the composite skin 5, which region includes a smooth joint) as the aerodynamic surface of the composite skin 5 of the wing 17. The length of the metal strips 9""' covers the length of the leading edge 4 for providing a full erosion protection of the leading edge 4. The width of the metal strip 9""' is such that it covers possible angles of attack generating different positions of imaginary lines defined by sets of stagnations points. Such wing 17 will also be of low weight due to its composite structure and composite skin 5 and narrow metal strip 9""'. FIG. 7b shows the wing 17 in a cross-section. The metal strip 9""' is flush mounted to the leading edge 4 and serve as at least one electrode in an actuator AC electrically connected to a plasma generator system 40 of the aircraft 15. A further electrode EC, for example in the form of a conductive nano filament assembly or any other form known in the art, is embedded in the upper composite skin 5 of the wing 17. This electrode EC serve as a receiver for reception of plasma and promoting and augmenting the laminar airflow a by means of plasma fields PF towards the composite skin outer surface 7, thus controlling the laminar airflow a over the wing 17. The airfoil article, such as a wing, may comprise additional actuators and electrodes connected to the same or another plasma generator system without departing for the scope of the present invention. FIG. 7c shows a further embodiment where the metal strip 9""' flush mounted to the leading edge 4 further is adapted for lightning protection. Furthermore, the tailing edge 4' is provided with a metal strip 9""' optionally also adapted for lightening protection and which also may be used as a receiver electrode RE for supporting the airflow a towards the upper surface 7 of the wing 17 by means of plasma fields PF. An actuator AC' for example made of a conductive nano filament assembly, or any other configuration known in the art, transmits the plasma fields PF to said receiver RE.

Since the elongated member of the leading edge described above is electrically conductive, it may also be used as a part of a lightning protection system of an aircraft. More specifically, it may function as an conductor of such a system. Even though it is previously known to design components of a lightning protection system out of for example Copper due to its high electric conductivity, it is more preferred to select an electrically conductive material with better erosion protection characteristics for the part of the lightning protection system on the leading edge. Therefore, the elongated member arranged at the leading edge is suitably made out of for example Titanium or its alloys, stainless steel, Aluminum alloys, Nickel alloys, electrically conductive ceramics, MMC or the like. Such materials may still function as an electrode of a lightning protection system due to their conductivity, but still provide the intended erosion protection.

As an alternative embodiment (even though less preferred), the elongated member flush with the aerodynamic surface of the leading edge need not necessarily be a part of the lightning protection system. In such a case, the lightning protection system is separate from the elongated member and an electrode of the lightning protection system is suitably provided in the vicinity of the elongated member of the leading edge.

Lightning protection system as such are previously known and will thus not be described in further detail here. For example U.S. Pat. No. 3,989,987 A describes lightening protection means.

FIG. 8 schematically illustrates an aircraft 15 comprising an elongated member in the form of a metal strip 30 mounted adjacent (i.e. mounted over an area of the leading edge sufficient covering the stagnation points SP so that the leading edge 4 is protected from erosion during normal use of the aircraft) the stagnation point SP near the wing's 17 leading edge 7, which stagnation point is defined as a point where the local velocity of the airflow in front of the leading edge is essentially zero, when the aircraft 15 is in motion through the air. The metal strip 30 is connected to the aircraft's 15 de-icing/anti-icing system 50. The stabilizer 3 of the aircraft 15 also comprises a metal strip 30 at the position adjacent the stagnation points SP of the stabilizer 3. This strip 30 is also connected to the de-icing/anti-icing system 50 of the aircraft 17. In such way is achieved that an airfoil article 1 (wing, stabilizer, fin, elevator etc.), exhibiting a part of an anti-/de-icing system 50, will be cost-effectively produced. The described anti-/de-icing system is using the elongated member(s) serving as erosion protection strip(s) on wings, and fins etc also to function as heating element or heating elements. Such multifunctional or bifunctional elongated members on the aircraft will reduce the overall cost and weight of the aircraft.

FIG. 9 schematically illustrates an aircraft 15 comprising leading edges 4 and trailing edges 4' with flush elongated members in the form of strips 32, such as metallic strips, within the area of the stagnations points. The strips 32 located at the leading edges may be connected to strips 32', such as metallic strips, at edges of the aircraft 15, the strips 32' extending also in the direction of flight in such way that all the strips 32, 32' form a lightning protected area. The strips 32 of the leading edges 4 are thus adapted to be conductively connectable to a lightning conductor system 60 of the aircraft 15. Thereby is provided that an airfoil article, exhibiting a part of a lightning conductor system, will be cost-effective produced and weight will be saved. Even though FIG. 9 illustrates a specific embodiment of strips, they need not necessarily be in the form of metallic strips. For example, a metallic net embedded in composite or plastic, or any other previously known lightening protection solution, may also be used on the other edges which are not leading edges without departing from the scope of the invention.

FIGS. 10a-10c schematically illustrate the determination of the width of an elongated strip 34 i.e. elongated member. The width of the strip 34 is dimensioned to at least cover the stagnation points SP1 of low angle of attack (FIG. 10a) and the leading edge stagnation points SP2 of high angle of attack (FIG. 10b). The width w of the strip 34 is defined as a measurement, taken transverse the elongation of the strip 34 and also transverse to the thickness t of the strip 34. In FIG. 10c is shown as an example where the width w of the strip 34 is determined by the low angle of attack LA (FIG. 10a) and high angle of attack HA (FIG. 10b). In such way is achieved that the strip 34 exhibits the lowest weight possible, but still the wing 17 will maintain its smooth aerodynamic surface and other functionality during use. In FIGS. 10a-10c a broken line defines the centre line CL of the chord of the airfoil article.

FIG. 11 schematically illustrates a wing 17 in a view from front. A strip 36 made of synthetic resin mixed with metal particles (not shown) is electrically conductive and arranged flush to the leading edge 4. The width of the strip 36 is dimensioned to cover the stagnation points of low angle of attack and the leading edge stagnation points of high angle of attack. The width is defined as the extension of the strip's 36 transverse direction relative its longitudinal elongation extending along the leading edge 4 and relative the strip's 36 thickness. By narrowing (tapering) the strip 36 towards the wingtip WT is achieved that the wing 17 will have the lowest weight possible at the same time as a long life hard aerodynamic surface is provided for the leading edge 4.

Figure 12:
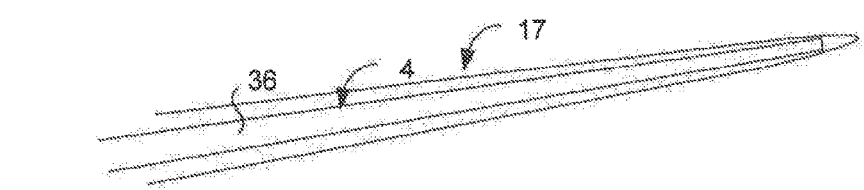
FIG. 12 shows a wing in a view from front with a wider elongated member in the form of a strip.

FIG. 12 schematically illustrates a wing 17 in a view from front. According to this embodiment the strip 36 covers not only the stagnation points (low angle and high angle of attack), but also zero angle of attack, wherein the strip 36 covers an area of the leading edge that is larger than the area defined by said stagnations points. By providing such a wider strip 36 having larger width, the leading edge of the wing will protect the leading edge from rain, dirt, hail etc. The strip in FIG. 12 is connected to a lightning conducting system (not shown) of the aircraft, as well as a plasma generating system (not shown)

Figure 13:
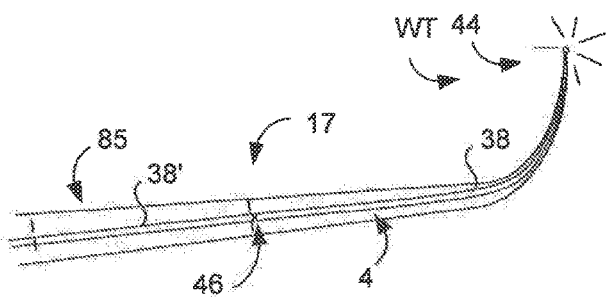
FIG. 13 illustrates an elongated member in the form of a metal strip tapering in the direction from one end to another.

FIG. 13 schematically illustrates an elongated member in the form of a metal strip 38, the width of which tapers in the direction from one distal end (wing root) to the wingtip WT. The flexibility of the wing 17 will not affect the metal strip 38 as it exhibits smaller width towards the wingtip WT. The wing 17 will during the flight bend to a greater extend within the wing tip WT section than the wing root section. The tapering metal strip 38 with relatively small width at the wing tip WT section provides flexibility in a sufficient manner. The width and thickness of the metal strip 38, in combination with material selection of the strip 38, are so determined that the metal strip 38 is so flexible that it easily can be bent and curved along the curvature of the leading edge 4 of the wing 17. In this embodiment the metal strip 38 comprises a multifunctional adaption, wherein one function is to provide electricity to a position light 44 of the wing 17. The strip 38 is divided in lengthwise sections 38'. In such way is it possible to easy repair the leading edge 4 having erosion protection functionality by just exchanging that part being damaged. A scarf joint 46 of the strips 38, 38' is filled with resin and electrically conductive nano filament structure and is finished after curing. The wing 17 forms a leading edge part, designed to be removable fixed to an adjacent leading edge part, the wing 17 comprises a first and a second transverse scarf joint adapted to fit adjacent leading edge parts 85.

Figure 14:
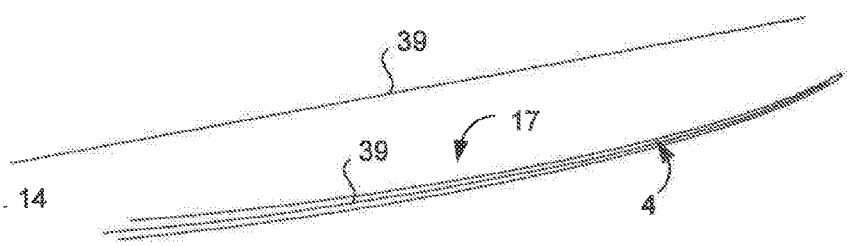
FIG. 14 shows an airliner wing.

FIG. 14 schematically illustrates a blended wing tip of an airliner wing 17 of composite material (epoxy reinforced by layers of fibers). An elongated member in the form of a strip 39 of metal is produced. The strip 39 exhibits a width essentially corresponding with different stagnation points of the leading edge 4. The length of the strip 39 covers the longitudinal length of the leading edge 4 for providing a full erosion protection to the airfoil article 1 (here wing). The strip 39 exhibits a continuously full length covering the length of the leading edge 4. This one piece mounting to the leading edge 4 is cost-effective.

Figure 15A:
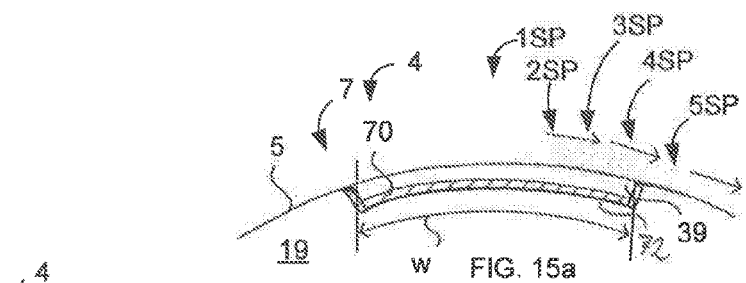
FIGS. 15a-15b illustrates a fin having an elongated member in the form of a metal strip and barrier coating.
Figure 15B:
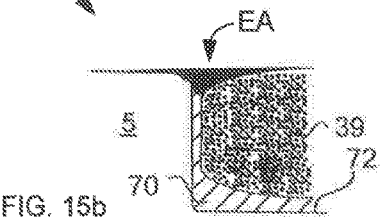

FIG. 15a schematically illustrates a fin 19 (vertical stabilizer) having an elongated member in the form of a metal strip 39 flush with the aerodynamic surface 7 of the leading edge 4. A first stagnation point 1 SP is shown where the angle of attack is zero (normal flight). Crosswind landing sometimes occurs wherein the airflow will have other angles of attack. A second, third, fourth angle of attack is determined to produce second, third, fourth stagnation points marked with 2SP, 3SP, 4SP. The illustrated theoretic fifth stagnation point 5SP much rarely occurs and an aircraft designer defines the width w of the strip 39 to be limited to a line extending between the fourth 4SP and fifth 5SP stagnation points. The same discussion regards the other (in the figure left side) side of the leading edge 4. A barrier coating 70 is provided between the strip 39 underside and an upper surface of the recessed area 72 of the composite skin 5. FIG. 15b schematically illustrates the metal strip 39 of steel being in flush mounting with the aerodynamic surface of the composite skin 5. A barrier coating 70 is provided between the strip 39 underside and an upper surface of the recessed area 72 of the composite skin 5 for protecting the strip 39 underside from corrosion in the event of moisture transportation through the composite skin 5. The strip 39 is fit into the recessed area 72 of the composite skin 5 and is fixedly mounted for example by means of an epoxy. The depth of the recessed area 72 is larger than the thickness of the strip 39 so that the barrier coating 70 does not provide a strip 39 protruding from the aerodynamic surface of the composite skin 5. An epoxy adhesive EA may also used for providing a smooth and hard aerodynamic transition area between the strip 39 outer surface and the composite skin 5 outer surface. This can be achieved by net moulding.

Figure 16:
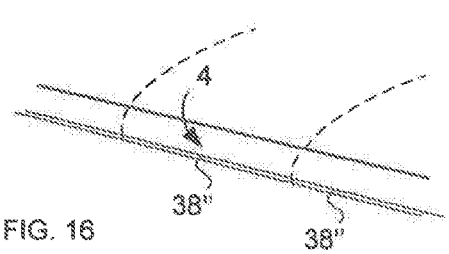
FIG. 16 shows a leading edge comprising an elongated member in the form of an erosion protection strips made of MMC material.

FIG. 16 schematically illustrates a leading edge 4 comprising a plurality of erosion protection strips 38" made of MMC material. In case of bird impact onto a portion of the leading edge 4 and the latter must be repaired, just one strip section has to be exchanged, which is cost-effective.

FIG. 17a-17d schematically illustrates the principle of stagnation points. A broken line defines the centre line CL of the chord. Airflow is marked with a. FIG. 17a shows the stagnation point SP0 at zero angle of attack. FIG. 17b shows the stagnation point SP1 at low angle L of attack. FIG. 17c shows the stagnation point SP2 at high angle H of attack. The airflow a impacts the leading edge 4 at the respective stagnation point SP0, SP1, SP2. In FIG. 17d is shown the airflow a meeting the leading edge 4 under high angle of attack and the airflow being divided into a lower LA and upper UA airflow. The upper airflow UA now streams over areas of the leading edge where previous zero angle stagnation point 0SP (at take off) and low angle stagnation point SP1 (at level flight) was located. It is important that the outer surface 7 is smooth and not rough due to erosion. The critical phase of flying, in which the highly critical slow velocity (near stalling speed) of the aircraft during final approach is determinant regarding a safe landing, can thereby be safer. It is important that high angle of attack during said approach will not produce turbulence over the leading edge aerodynamic surface due to rain erosion affecting the leading edge under level flight.

FIG. 18 schematically illustrates a portion of a leading edge of a prior art wing. The stagnation point phenomena have eroded (cavities 102) the composite skin surface 100 due to rain erosion. At different angle of attack 101, cavities 102 will make a non-laminar airflow a1 over the airfoil. Service personal mount tapes T or metal plates (not shown) to the leading edge. However, this will disturb the laminar flow as well. In FIG. 18 SP1 denotes the stagnation point at low angle of attack and a the airflow.

FIG. 19 schematically shows a multifunctional strip member 209. An elongated member in the form of a strip is applied onto the leading edge 4 and flush with the composite skin. The strip 4 exhibits a thicker middle section 202 and outermost thinner sections 201. A very small gap may optionally be provided between respective middle section 202 and outermost thinner section 20 if desired. Adjacent the outermost sections (side by side) there is provided a Copper net 200, adjacent to the leading edge item 201, thus starting at the end of outermost thinner sections 201. A gap g is provided between the Copper net 200 and the respective outermost thinner section 201 remote from the middle section of the strip 4. The Copper net 200 is embedded in plastic. The middle section 202 serve as main erosion protection at the same time as the outermost thinner sections 201 serve as a substrate for emitters for producing a plasma field PF to receivers 212 promoting laminar airflow. At least the outermost thinner sections 201 of the strip 4 also serve as a heating element de-/anti-icing device for promoting laminar airflow. The net 200 is an alternative embodiment of the present invention and serve as a lightning protection, saving the aerodynamic surface, thus promoting laminar airflow. The lightening protection of the multifunctional strip can alternatively be achieved by the strip member 209 (i.e. elongated member) itself or by the strip member 209 in combination with the net 200. Each property (200, 201, 202) of the strip member 209 of the leading edge 4 contributes to promote the laminar flow. The outer surface (aerodynamic surface) of the leading edge 4 is smooth for achieving laminar flow.

The metal strip or strip member (i.e. elongated member) in any one of the examples described hereinbefore may exhibit a thicker middle section and outermost thinner sections, such as described in the example in FIG. 19, without departing from the scope of the invention. For example the elongated member 9 in FIG. 1 may also comprise a thicker middle section and at least one thinner outmost section.

Figure 20:
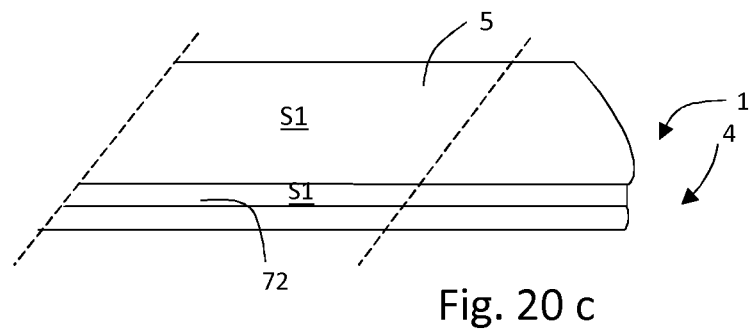
FIG. 20a illustrates an exploded view of an airfoil article.
FIG. 20b illustrates an elongated member.
FIG. 20c illustrates an airfoil article not including an elongated member.
FIGS. 20d-20f illustrates a cross section view of an elongated member.
Figure 20:
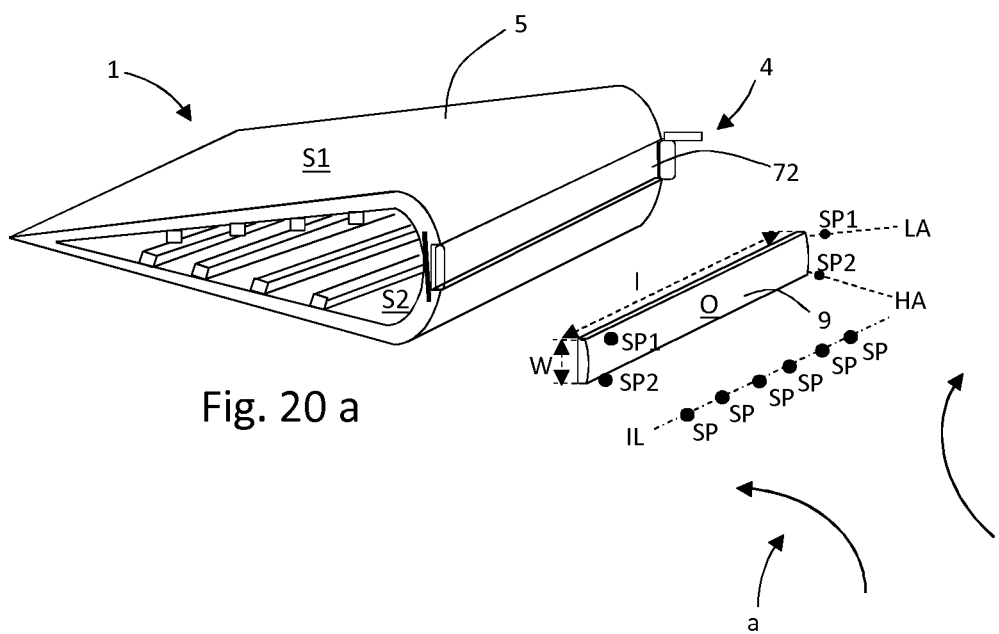
Figure 20:
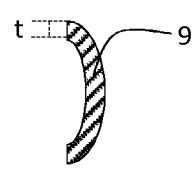
Figure 20:
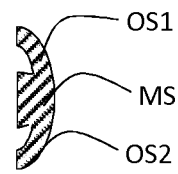
Figure 20:
Figure 20:
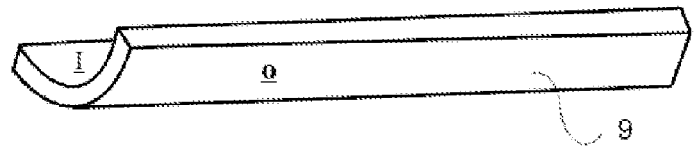

FIG. 20 a schematically shows an exploded view of a airfoil article 1 comprising a composite skin 5, wherein the composite skin has a first surface S1 and a second surface S2 opposite to said first surface. The composite skin 5 is forming a leading edge 4 and is adapted to during use be subjected to an airflow a meeting the leading edge at stagnation points SP, The airflow a is divided into a first a1 and second a2 airflow (not shown in the figure). At the stagnation points SP the local velocity of the airflow is essentially zero. The leading edge 4 comprises an elongated member 9 comprising an electrically conductive material. The elongated member has an inner surface I and an outer surface O opposite to said inner surface I, as shown in FIGS. 20a and 20b. The outer surface O of the elongated member 9 is adapted to be arranged flush with the first surface S1 of the composite skin 5, in the recessed area 72 in the composite skin, such that an essentially smooth aerodynamic surface of the leading edge 4 is formed. The elongated member has an extension in a length direction l being essentially parallel with an imaginary line IL intersecting with the stagnation points SP and a width w extending in a chord wise direction at least covering the stagnation points SP1 of low angle LA of attack and the stagnation points SP2 of high angle HA of attack and the area there between, The elongated member is adapted to serve as an erosion protection of the leading edge and to function as an electrode of a plasma generating system.

In FIG. 20a the elongated member is illustrated having an essentially uniform thickness. FIG. 20d illustrates a cross sectional view of one embodiment of the elongated member 9, wherein the elongated member has an essentially uniform thickness t. Another embodiment of the elongated member 9 is illustrated in FIG. 20e. In this embodiment the elongated member 9 comprises a middle section MS and two outer sections OS1, OS2, the elongated member 9 has a greater thickness in the middle section MS than the thickness of each of the two outer sections OS1, OS2. In FIG. 20f a further embodiment of the elongated member (9) is illustrated comprising a first (E1) and a second component (E2), wherein the first component (E1) of the elongated member (9) has a uniform thickness and wherein the second component of the elongated member (E2) is attached to the inner surface (I) of the first component (E1) such that a thicker middle section of the elongated member is achieved.

Figure 21:
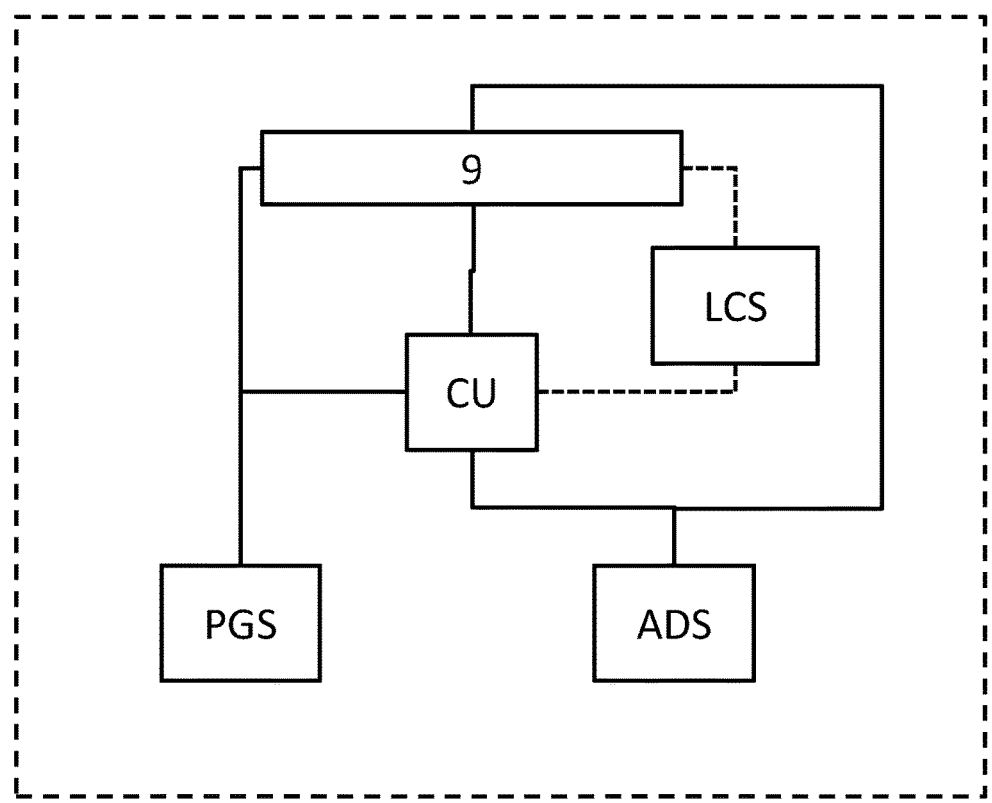
FIG. 21 illustrates a flow chart representative of a system according to one example of the present invention.

FIG. 21 schematically illustrates a system for an airfoil article in accordance with one example of the invention. As shown in the figure, the system comprises a plasma generating system PGS. The elongated member as described above is electrically connected to the plasma generating system either directly or through a control unit CU. The plasma generating system may as such be construed in accordance with prior art and may include a plurality of emitters and receivers. The elongated member 9 constitutes a part of the plasma generating system PSG by functioning as an electrode thereof. More specifically, it functions as at least one electrode of the actuator of the plasma generating system PSG. A plasma is generated by applying an alternating current with high frequency to the elongated member 9, thereby enabling a plasma to be generated between the elongated member and a receiver (not shown) of the plasma generating system.

The system may further include an anti-/de-icing system ADS wherein the elongated member 9 is functioning as a resistive heating element thereof. This may be achieved by supplying a direct current to the elongated member 9. This could be achieved by connecting the anti-/de-icing system ADS to the elongated member 9 either directly or through a control unit.

The system may further comprise a lightning conductor system LCS to provide protection in case of a lightning strike. The elongated member may be connected to said LCS and constitute a conductor thereof. The lightning conductor system is suitably a passive system and does not need any power supply. However, it may suitably be connected to the control unit CU or the like in order to ensure that the plasma generating system and the optional anti-/de-icing system are controlled appropriately in case of a lightning strike.

Even though not specifically illustrated in the FIG. 21 each of the plasma generating system and the anti-/de-icing system may include further control units and may be construed in accordance with known prior art systems as long as the elongated member 9 of the leading edge at least functions as an electrode of the plasma generating system, and preferably also as the heating element of the ant-/de-icing system.

The present invention is of course not in any way restricted to the preferred embodiments described above, but many possibilities to modifications, or combinations of the described embodiments, thereof should be apparent to a person with ordinary skill in the art without departing from the basic idea of the invention as defined in the appended claims.

The invention claimed is:

1. An airfoil article including a composite skin, the composite skin having a first surface and a second surface opposite to said first surface, the composite skin forming a leading edge and adapted to during use be subjected to an airflow meeting the leading edge at stagnation points, where the airflow is divided into a first and second airflow, and at which stagnation points the local velocity of the airflow is essentially zero, the leading edge comprising:

an elongated member comprising an electrically conductive material, the elongated member having an inner surface and an outer surface opposite to said inner surface, wherein the outer surface of said elongated member is arranged flush with the first surface of the composite skin such that an essentially smooth aerodynamic surface of the leading edge is formed, the elongated member has an extension in a length direction being essentially parallel with an imaginary line intersecting with the stagnation points of a zero angle of attack and a width extending in a chordwise direction and tapering in a direction from one distal end to another end along the leading edge, and wherein the elongated member is configured to serve as an erosion protection of the leading edge and constitutes an electrode of a plasma generating system.

2. The airfoil article according to claim 1, wherein the elongated member is further adapted to serve as a heating element of a de-/anti-icing system.

3. The airfoil article according to claim 1, wherein the elongated member is adapted to serve as a conductor of a lightning conductor system.

4. The airfoil article according to claim 1, wherein the elongated member is adapted to operate using alternating current.

5. The airfoil article according to claim 1, wherein the elongated member is adapted to operate using a direct current and/or an alternating current superposed on a direct current.

6. The airfoil article according to claim 1, wherein a length of the elongated member corresponds with at least a longitudinal length of the leading edge.

7. The airfoil article according to claim 1, wherein the elongated member is a metal matrix composite.

8. The airfoil article according to claim 1, wherein the elongated member is ceramic.

9. The airfoil article according to claim 1, wherein the elongated member is metallic.

10. The airfoil article according to claim 1, wherein a trailing edge of the airfoil article comprises a second elongated member having an outer surface flush with the outer surface of the composite skin, the second elongated member being provided to follow an imaginary line intersecting with the trailing edge.

11. The airfoil article according to claim 1, wherein a width and a thickness of the elongated member, in combination with material selection of the elongated member, are determined such that the elongated member will be flexible in at least a length direction and/or a width direction of the elongated member, such that the elongated member can conform with a curvature of the leading edge.

12. The airfoil article according to claim 1, wherein the elongated member is divided in lengthwise sections.

13. The airfoil article according to claim 1, further comprising:
a barrier coating between the elongated member and the composite skin.

14. The airfoil article according to claim 1, wherein the elongated member is fit into a recessed area of the composite skin, wherein a depth of the recessed area is essentially equal to the thickness of the elongated member after curing of the composite skin.

15. The airfoil article according to claim 1, wherein the elongated member in the chordwise direction comprises a middle section and two outer sections, the elongated member has a greater thickness in the middle section than a thickness of each of the two outer sections.

16. The airfoil article according to claim 1, wherein the airfoil article forms a leading edge part, designed to be replaceably fixed to an adjacent leading edge part, the article further comprising:
a first transverse scarf joint and a second transverse scarf joint adapted to fit adjacent leading edge parts.

17. An aircraft, comprising:
at least one airfoil article including a composite skin, the composite skin having a first surface and a second surface opposite to said first surface, the composite skin forming a leading edge and adapted to during use be subjected to an airflow meeting the leading edge at stagnation points for a zero angle of attack, where the airflow is divided into a first and second airflow, and at which stagnation points the local velocity of the airflow is essentially zero, the leading edge comprising:
an elongated member comprising an electrically conductive material, the elongated member having an inner surface and an outer surface opposite to said inner surface wherein the outer surface of said elongated member is arranged flush with the first surface of the composite skin such that an essentially smooth aerodynamic surface of the leading edge is formed, the elongated member has an extension in a length direction being essentially parallel with an imaginary line intersecting with the stagnation points and a width extending in a chordwise direction and tapering in a direction from one distal end to another end along the leading edge, and
wherein the elongated member is configured to serve as an erosion protection of the leading edge and constitutes an electrode of a plasma generating system; and a plasma generating system.

18. A system for an airfoil article, the airfoil article including a composite skin having a first surface and a second surface opposite to said first surface, the composite skin forming a leading edge and being adapted during use to be subjected to an airflow meeting the leading edge at stagnation points for a zero angle of attack, where the airflow is divided into a first and second airflow, and at which stagnation points a local velocity of the airflow is essentially zero, the leading edge comprising an elongated member comprising an electrically conductive material, the elongated member having an inner surface and an outer surface opposite to said inner surface wherein the outer surface of said elongated member, is arranged flush with the first surface of the composite skin such that an essentially smooth aerodynamic surface of the leading edge is formed, the elongated member has an extension in a length direction being essentially parallel with an imaginary line intersecting with stagnation points and a width extending in a chordwise direction at least covering stagnation points of a first angle of attack and stagnation points of a second angle of attack and an area therebetween and tapering in a direction from one distal end to another end along the leading edge, wherein the elongated member is configured to serve as an erosion protection of the leading edge, the system further comprising:
a plasma generating system comprising an actuator with a first electrode and a second electrode for generation of a plasma, wherein the elongated member constitutes said first electrode, and
at least one control unit electrically coupled to said elongated member for controlling an electrical power supply to the elongated member.

19. The system according to claim 18, further comprising:
an anti-/de-icing system comprising a resistive heating element for heating of at least a part of a leading edge of the airfoil, wherein the elongated member constitutes said heating element.

20. The system according to claim 18, further comprising:
a lightning conductor system adapted to protect the airfoil in the event of a lightning strike, the lightning conductor system comprising a first conductor, and wherein said first conductor constitutes the elongated member.

21. The system according to claim 18, wherein the elongated member is adapted to operate using at least one of direct current or alternating current.

* * * * *